Sept. 20, 1971    M. JACQUEMIN    3,606,206
SPIN CASTING REEL
Filed Dec. 30, 1968    3 Sheets-Sheet 3
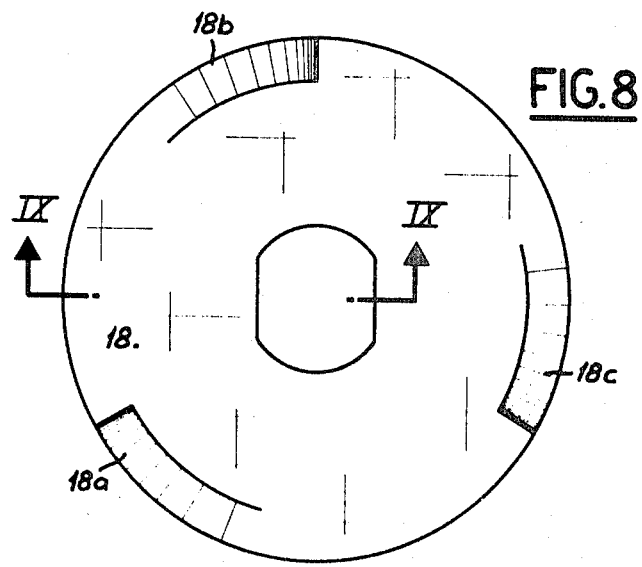
FIG.8
FIG.9
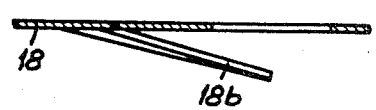
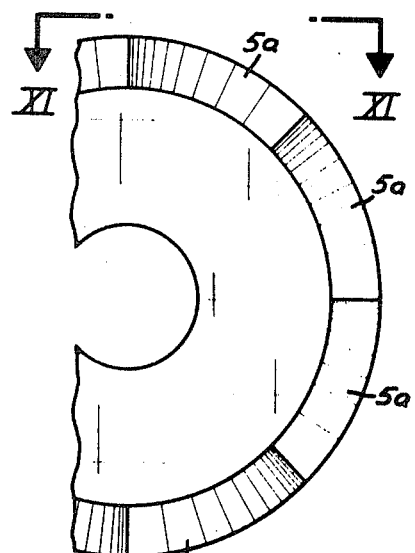
FIG.10
FIG.11
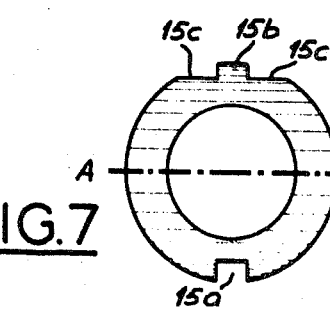
FIG.7
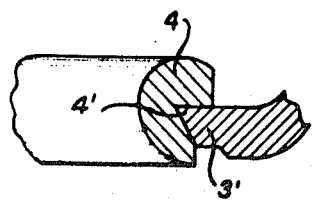
FIG.12

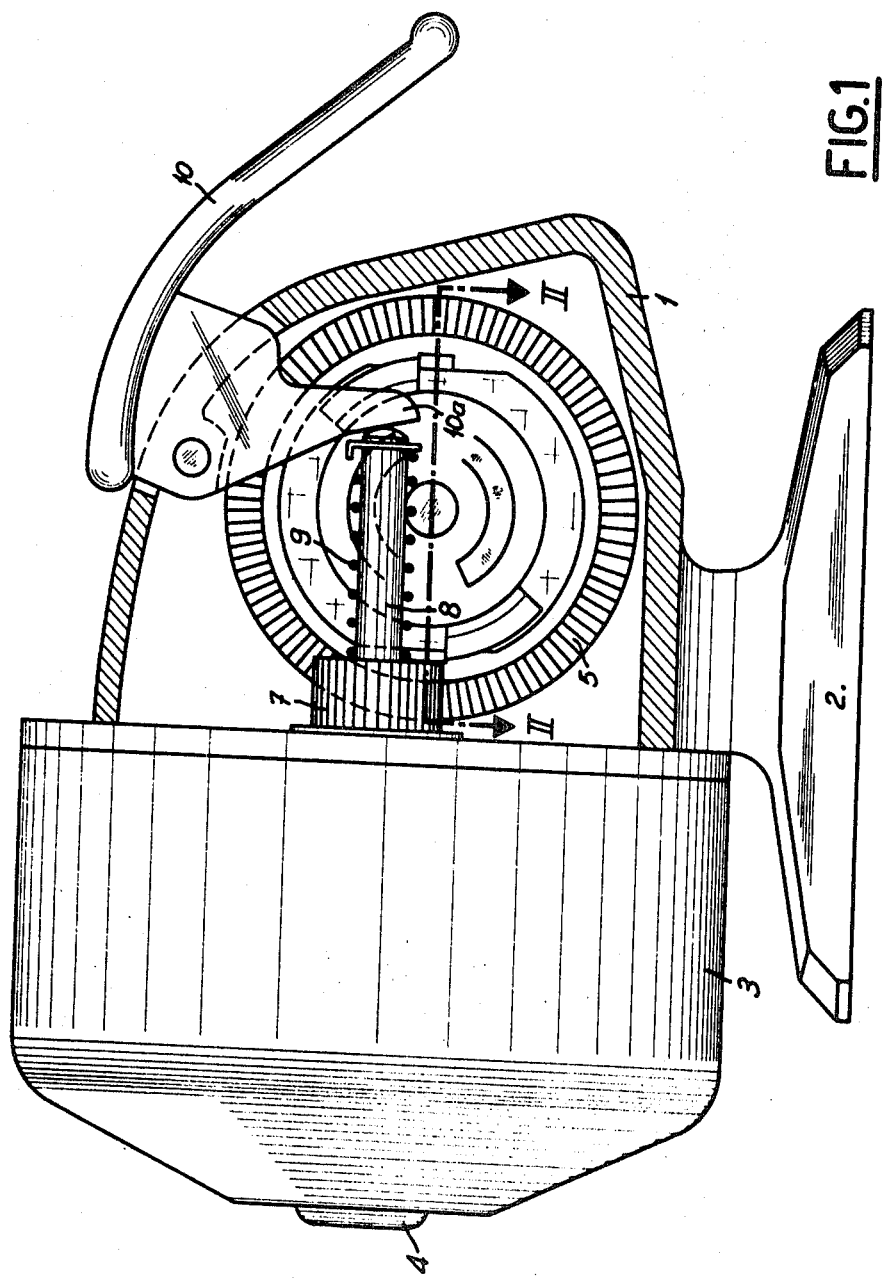

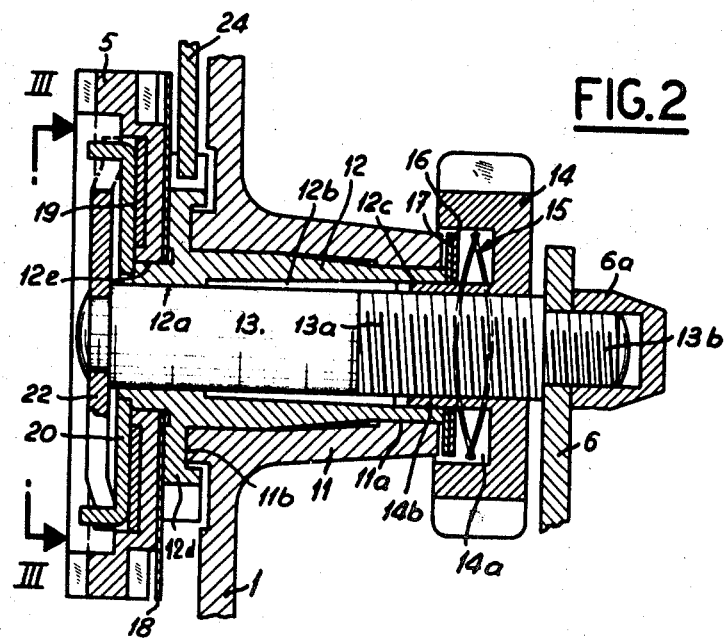
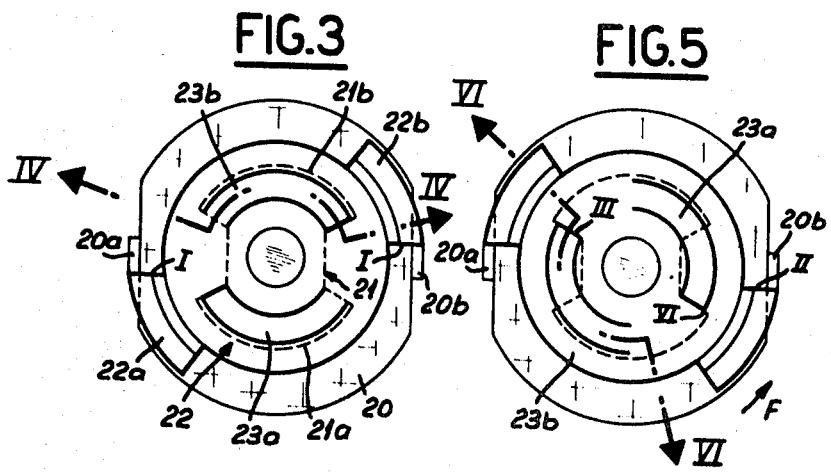
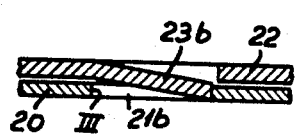
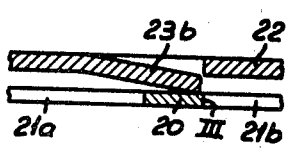

United States Patent Office 3,606,206
Patented Sept. 20, 1971

3,606,206
SPIN CASTING REEL
Maurice Jacquemin, Clauses, France, assignor to
Carpano & Pons, Clauses, France
Filed Dec. 30, 1968, Ser. No. 787,755
Claims priority, application France, Feb. 7, 1968,
139,013
Int. Cl. A01k 89/02
U.S. Cl. 242—220                                6 Claims

ABSTRACT OF THE DISCLOSURE

A pin casting reel having a clutch device in which the torque limiting mechanism has a nut which screws on a crank shaft, with a ratchet wheel slidingly mounted on the shaft to lock the same in one direction. The ratchet wheel is urged by a spring against a friction washer in contact with one side of a drive gear of the mechanism while a second friction washer is applied against the other side of the wheel by a supporting disc fixed on the shaft and forming one of the members of the limiting mechanism which also has a movable member fixed on the crank shaft and facing the support disc from the side opposite the wheel. The support disc and movable member bear on one another through at least one ramp which makes possible a relative axial movement of said members dependent upon the angular position of one with respect to the other. These members also having at least two checks and two catches adapted to cooperate to produce the disconnection of the limiting member when the crank is driven in the direction opposite the winding direction.

---

In reels which have a torque limiting device between the driving mechanism and the crank and in particular in spin casting reels, the frictions and the demultiplications which come into play are such that if the torque limiting device is adjusted to enable the retrieval of the line subjected to a given stress, the unwinding of this line by acting directly thereon is only possible by the exertion of a pull which is 3 to 4 times greater than this force. To palliate this drawback, certain manufacturers have been led to equip their reels with lines having a very large cross section.

Other more recent reels have been provided with a device for momentarily disconnecting the limiting device by rotating the crank in a direction opposite to that which winds the line: there should be noted in particular those which form the object of U.S. Patents 1,981,429; 2,977,065; 3,025,020; 3,143,315; 3,297,275 and French Patent 1,179,447.

The present invention also has for its object a reel of the above mentioned type which is equipped with a clutch device in which the torque limiting component includes a nut which screws on the crank shaft, with a ratchet wheel slidably mounted on the shaft for unidirectionally blocking the latter. The ratchet wheel is pushed by a spring against a friction washer in contact with one side of a primary wheel or drive gear of the mechanism, and a second friction washer is applied against the other side of the wheel by a supporting disc mounted for rotation on the shaft. The reel of the invention is further characterized in that the supporting disc is fixed to the ratchet and forms one of the members of the clutch device of the torque limiting means the other member of which is a movable member fixed to the crank shaft and facing the disc from the side opposite the wheel, one of said members, disc or movable member, bears against the other by means of a ramp which makes possible a relative spacing of these members which depends upon the angular position of one with respect to the other. One of these members has, at least two checks and the other at least, two catches adapted to cooperate. One of such cooperative pairs delimits the rotation of the crank shaft in order that axial translation from one member of the device to the other, and, consequently translation, of the shaft relative to the ratchet, be sufficient to produce the disconnection of the limiting device when this crank is moved in a direction opposite the winding direction. The other of such cooperative pairs allows the crank to wind the line.

In the drawings:

FIG. 1 is a side elevation with fragmentary vertical cross section of the reel of the invention;

FIG. 2 is a cross section taken along line II—II of FIG. 1 showing the torque limiting device and the clutch device for this torque limiting device;

FIG. 3 is a cross section along the line III—III of FIG. 2;

FIG. 4 is a cross section taken along line IV—IV of FIG. 3.

FIG. 5 is a similar view to that of FIG. 3 for another position of its elements;

FIG. 6 is a cross section taken along line VI—VI of FIG. 5;

FIG. 7 is an elevational view showing an element of the spring with which is equipped the torque limiting device;

FIG. 8 is a front view of a friction disc also forming the noise-making element of the reel;

FIG. 9 is a cross section taken along line IX—IX of FIG. 8;

FIG. 10 is a partial view seen from the back of the primary toothed disc of the driving mechanism of the reel;

FIG. 11 is a cross section along line XI—XI of FIG. 10.

FIG. 12 shows in cross section the eyelet 4 mounted on bell 3.

The present reel comprises a housing 1 having a foot 2 by which the reel is secured to a fishing rod. The housing 1 contains the mechanism for rotating a retrieval pick-up (not shown) surrounded by a spool container 3 having at its peak an eyelet 4 which allows passage of the line. This mechanism for rotating the pick-up comprises in particular a toothed ring gear or drive gear 5 which the fisherman turns by rotating on a crank 6 (FIG. 2) and a pinion 7 in mesh with the drive gear 5 and fixed to the pick-up. The spool and pinion assembly is axially movable to allow the device to be used for casting. For this purpose the pick-up is mounted at the extremity of a rod 8 which can slide inside pinion 7 when it is pushed against a spring 9 by the beak 10a of a push button 10 which projects from casing 1 and is pivotally mounted thereon.

The mechanism which drives tray 5 is illustrated in detail on FIG. 2. There can be seen on this figure a portion of the casing 1 of the reel on which projects a truncated projection 11, which is flared and forms at its free end a shoulder 11a and which has a small collar 11b.

In the opening of projection 11 pivots a sleeve 12 carrying a ratchet wheel 12d whose right hand extremity projects slightly outside projection 11 when ratchet wheel 12d is applied against the small collar 11b as shown in FIG. 2. The opening of sleeve 12 is cylindrical at 12a, truncated at 12b, and again cylindrical at 12c but of a diameter greater than that of part 12a.

In this sleeve is slidably and axially mounted a shaft 13 having at 13a a thread on which is screwed a star-shaped nut 14, and having at its right hand extremity a second threaded part 13b which has lesser radial dimensions than part 13a, and on which is screwed nut 6a gripping crank 6.

The star-shaped nut 14 has an annular housing 14a defining a bearing portion 14b which is screwed on shaft 13 for sliding in opening 12c of sleeve 12 during axial movement of nut 14. Reciprocally, sleeve 12 carrying ratchet 12d can also slide on bearing portion 14b of nut 14 which ensures guiding of shaft 13.

Threading movement of nut 14 does in fact translate itself only by a longitudinal action on shaft 13, because this nut acts on sleeve 12 through spring 15 in contact on the one hand with the bottom of housing 14a, and on the other hand with a washer of self lubricating plastic material 16, preferably of polytetrafluorethylene resting on sleeve 14 by means of a second metallic bearing washer 17. All tightening of nut 14 tends to compress spring 15 and translates itself into an increase of bearing pressure of washer 17 against sleeve 12 if shaft 13 is maintained immobile in the axial direction.

In the embodiment shown, spring 15 is constituted of an inverted face to face assembly of two washers of the type shown in FIG. 7 the cross section of which is curved in order to give them a cylindrical curvature of an axis of revolution lying within a plane passing through A—A.

Besides, each washer has a rectangular notch 15a the axis of symmetry of which passes by its centre, perpendicularly to the fictional line A—A above, this notch 15a having a shape and dimensions which correspond to that of a projection 15b which is diametrically opposite thereto and in which is obtained by cutting out the washer in such a way as to define between two edges 15c on either side of the projection 15b, edges which are directed parallel to line A—A. The projection or tooth 15b of one of the washers is engaged in the notch 15a of the other and vice versa and each washer bears upon the other by its edges 15c as well as by the foot of this projection 15b.

The compression and successive relaxation of one pair of washers mounted as shown in FIG. 2 will take place without relative movement of one contacting part of one washer relative to another. Spring 15 is stronger and of a longer life than conventional springs.

The toothed drive gear 5 is freely mounted on the outside of a portion 12e of sleeve 12 which projects to the left of ratchet wheel 12d. Between this gear 5 and ratchet wheel 12d, the reel has a fractional washer 18 in which are cut three small tongues 18a, 18b and 18c (FIGS. 8 and 9) and which is also freely mounted on part 12e of sleeve 12.

As shown in FIG. 9, these small tongues are slightly bent in the direction of the toothed gear 5 in order to alternately come in contact with the eight teeth 5a of gear 5 on the face thereof facing washer 18 (FIGS. 10 and 11). In effect for a relative rotation of one turn of gear 5 and washer 18, the blades of this washer will strike successively eight times three teeth, or in all twenty-four times.

In reality, it is the drive gear 5 which will move during unwinding of the line from the spool by a pull exerted on the line. It is the noise produced by the impact of the blades on teeth 5a which will tell the fisherman that unwinding is taking place.

This result can just as well be obtained with a washer 18 which only has one single small tongue and a toothed gear 5 which has 24 teeth. But the design of the invention gives to the smaller number of teeth of gear 5 a larger cross section and consequently a greater resistance to wear. Moreover, the presence of three small tongues instead of one on washer 18 makes it possible for each to work one third less.

If the pressure exerted by spring 15 on sleeve 12 and through ratchet gear 12d on the friction washer 18 and wheel 5 is sufficient, this gear will be rotated by sleeve 12. This rotation can also be obtained by means of an additional friction washer 19 in the bottom of an annular housing 5b of gear 5 and on which bears a ring gear or support disc 20 keyed angularly on sleeve 12 but capable of certain axial movement on this sleeve.

Disc 20 has on its edges two folds 20a and 20b forming checks and is cut in its center to define an opening 21 shown in dotted lines in FIGS. 3 and 5. This opening has parallel edges in its central part and a flare at each extremity along a rounded profile at 21a and 21b respectively. Disc 20 faces a movable member in the form of another disc 22 riveted to the left hand extremity of shaft 13 and the shape of which is emphasized on the drawing (FIGS. 3 and 5) by the use of a thicker line.

Disc 22 which is substantially circular has on its edges two ears 22a and 22b and is cut out to form two small tongues 23a and 23b extending along a length corresponding to that of rounded flares 21a and 21b of opening 21 of disc 20. The small tongues 23a and 23b are folded in the direction of disc 20 along a relatively small slope and their surface is smooth and hard.

The relative distance of discs 20 and 22 have been selected such that in the relative angular position shown in FIG. 3, small tongues 23a and 23b take position in the rounded flares 21a and 21b of the opening 21 of disc 20 without touching the outer edges of these flares. In this case, ears 22a and 22b of disc 22 are in contact respectively with checks 20a and 20b by the face thereof indicated by reference character I.

By rotating disc 22 relative to disc 20 in the direction F (FIG. 5) until the same ears 22a and 22b contact respectively with checks 20b and 20a respectively by their side II, the small tongues 23a and 23b which have an elastic rigidity greater than that of spring 15 move by contact with the edges III of IV of flares 21a and 21b until they occupy the position shown in FIG. 5. In the course of so doing these small tongues will go over edges III and IV without deforming themselves while axially driving shaft 13 from right to left in FIG. 2, as disc 22 moves away from disc 20 (FIG. 6). But this movement of shaft 13 also means an increased compression of spring 15, and, therefore, a substantial increase in the bearing force exerted by ratchet wheel 12d against frictional washer 18, and by this washer on toothed gear 5.

As a result the frictional washer 19 will be more strongly urged against the toothed gear. In effect, the torque which will have to be generated on gear 5 to interrupt the kinematic link with shaft 13 through frictional washers 18 and 19 will therefore be much greater when discs 20 and 22 are in the position shown in FIG. 5 than when they will have been brought into the position of FIG. 3.

However, the corresponding relative movement of crank 6 and of sleeve 12 is not possible in the reel of the invention unless it is possible to block the sleeve angularly. This blocking which takes place by means of a pawl 24 meshing with ratchet wheel 12d when crank 6 is driven in the direction contrary to the winding direction of the line.

It is thus by moving the crank in this direction along a course limited by checks 20a and 20b of disc 20 that the torque limiting device will be loosened (FIG. 4) while a movement in a contrary direction will tend to tighten this limiting device. Thus, the checks 20a and 20b, and the ears or catches 22a and 22b, functions as ratchet means.

In the first case, all pull directly exerted on the line will only encounter a relatively reduced resistance on the part of the torque limiting device while in the second instance this resistance will be considerably greater. Contrarywise, movement of the crank in order to proceed to retrieval of the line will only have to overcome the frictional force of sleeve 12 in projection 11 and those due to the spool and the ease of pivoting of shaft 8.

What is claimed is:
1. A spin casting reel including a line pick-up, a driving mechanism for said pick-up, a shaft having an actuating crank fixed thereto for rotating said mechanism, a torque limiting device positioned between said crank and said mechanism, and means for disconnecting said torque limiting device by rotating said crank in the direction opposite the direction which winds said line on an associated spool, wherein said torque limiting device comprises a nut mounted on the shaft of said crank, a ratchet wheel slidably mounted on said shaft for unidirectionally blocking said shaft, a drive gear for driving said pick-up, said drive gear mounted for rotation about said shaft, a first friction washer disposed between and engaging said ratchet wheel and one side of said drive gear, spring means bearing against said nut and pushing said ratchet wheel against said friction washer, a support disc mounted on said ratchet wheel for rotation therewith, a second friction washer disposed between and engaging said support disc and the other side of said drive gear, and wherein said means for disconnecting said torque limiting device comprises said support disc, a movable member fixed on said shaft and facing said disc from the side opposite said second friction washer, ramp means disposed between said movable member and said disc to provide a spacing therebetween dependent upon the angular position of said disc and said member, and ratchet means disposed between said support disc and movable member for connecting said torque limiting device when said crank is moved in the direction opposite the winding direction, and for allowing rotation of said drive gear when said crank is moved in the winding direction.

2. A reel according to claim 1, wherein said support disc and said movable member comprise, respectively, a pair of stamped plates, the support disc plate having at least one tongue forming a part of a ring and folded transversally to the plane of said plate to form said ramp means, and the movable member plate having an oblong cut out of a shape and size corresponding to said tongue, said tongue being engaged in said cut out and bearing on one of the outer edges of the cut out during the relative angular movement of said disc and said movable member.

3. A reel according to claim 1, wherein said ratchet means comprise a plurality of checks and ears and wherein said disc carries said checks and said movable member carries said ears.

4. A reel according to claim 1, wherein said spring means comprises two washers, each having a cylindrically curved cross section, said washers having their concave surfaces facing one another and having their outer edges in abutment with one another.

5. A reel according to claim 4, wherein the contacting edges of said washers are cut out to provide interconnecting notches and teeth.

6. A reel according to claim 1, wherein said first friction washer comprises a thin metallic disc having a plurality of elastic pawls adapted to strike the side of said drive gear, said drive gear having a plurality of annularly arranged notches for being contacted by said pawls to produce a noise for indicating slippage of the torque limiting device.

References Cited
UNITED STATES PATENTS

| | | | |
|---|---|---|---|
| 2,977,065 | 3/1961 | Holahan, Jr. | 242—84.54 |
| 3,097,814 | 7/1963 | Sarah | 242—84.54 |
| 3,143,315 | 8/1964 | Harrington et al. | 242—84.45 |
| 3,223,349 | 12/1965 | Holahan | 242—84.45 |

BILLY S. TAYLOR, Primary Examiner